(12) United States Patent
Amani et al.

(10) Patent No.: US 11,460,567 B2
(45) Date of Patent: Oct. 4, 2022

(54) RADAR APPARATUS AND METHOD

(71) Applicant: NXP B.V., Eindhoven (NL)

(72) Inventors: Navid Amani, Gothenburg (SE); Alessio Filippi, Eindhoven (NL); Feike Guus Jansen, Eindhoven (NL)

(73) Assignee: NXP B.V., Eindhoven (NL)

( * ) Notice: Subject to any disclaimer, the term of this patent is extended or adjusted under 35 U.S.C. 154(b) by 215 days.

(21) Appl. No.: 16/888,139

(22) Filed: May 29, 2020

(65) Prior Publication Data

US 2021/0373144 A1 Dec. 2, 2021

(51) Int. Cl.
| | | |
|---|---|---|
| *G01S 13/87* | (2006.01) | |
| *G01S 13/06* | (2006.01) | |
| *G01S 7/35* | (2006.01) | |

(52) U.S. Cl.
CPC .............. *G01S 13/06* (2013.01); *G01S 7/352* (2013.01); *G01S 13/872* (2013.01)

(58) Field of Classification Search
CPC ........ G01S 13/06; G01S 13/872; G01S 7/352; G01S 13/34; G01S 13/426; G01S 13/931; G01S 13/87; G01S 7/35; G01S 13/02; G01S 13/42; G01S 13/44
See application file for complete search history.

(56) References Cited

U.S. PATENT DOCUMENTS

| | | | | |
|---|---|---|---|---|
| 7,903,617 | B2* | 3/2011 | Liu | H04B 1/126 370/335 |
| 2017/0149147 | A1 | 5/2017 | Minami et al. | |
| 2017/0356990 | A1* | 12/2017 | Asanuma | G01S 7/354 |
| 2018/0166794 | A1* | 6/2018 | Raphaeli | H01Q 21/28 |
| 2018/0292510 | A1* | 10/2018 | Rao | G01S 7/4026 |
| 2020/0161775 | A1* | 5/2020 | Zhu | H01Q 21/28 |
| 2020/0249344 | A1* | 8/2020 | Heo | G01S 13/931 |
| 2020/0321710 | A1* | 10/2020 | Shtrom | H04B 7/08 |
| 2020/0355788 | A1 | 11/2020 | Kitamura et al. | |

(Continued)

FOREIGN PATENT DOCUMENTS

CN 110741273 A * 1/2020 .......... G01S 13/931

OTHER PUBLICATIONS

P. P. Vaidyanathan and P. Pal, "Sparse Sensing with Co-Prime Samplers and Arrays" IEEE Trans. Signal Process., vol. 59, No. 2, pp. 573-586, Feb. 2011.

(Continued)

*Primary Examiner* — Timothy A Brainard

(57) ABSTRACT

Aspects of the present disclosure are directed to radar signaling utilizing a non-uniform multi input/multi output (MIMO) antenna array including first and second uniform MIMO antenna arrays respectively having both sparsely-arranged transmitting antennas and sparsely-arranged receiving antennas. Communication circuitry is configured to determine a direction of arrival of reflections of radar signals transmitted by the transmitting antennas and received by the receiving antennas, by comparing the reflections received by the first MIMO array with the reflections received by the second MIMO array during a common time period (e.g., at the same time). Using this approach, the antenna arrays may be utilized to provide co-prime spacing/elements and to suppress ambiguities in received reflections based on alignment thereof.

20 Claims, 5 Drawing Sheets

(56) References Cited

U.S. PATENT DOCUMENTS

2021/0072350 A1* 3/2021 Loesch .................... G01S 7/40

OTHER PUBLICATIONS

T. J. Shan, M. Wax, and T. Kailath, "On Spatial Smoothing for Direction-of-Arrival Estimation of Coherent Signals" IEEE Trans. Acoustics, Speech, and Signal Process., vol. ASSP-33, No. 4, pp. 806-811, Aug. 1985.

E. BouDaher, F. Ahmad, and M. G. Amin, "Sparsity-Based Direction Finding of Coherent and Uncorrelated Targets Using Active Nonuniform Arrays" IEEE Signal Process. Lett., vol. 22, No. 10, pp. 1628-1632, Oct. 2015.

J. Shi, G. Hu, X. Zhang, F. Sun, and H. Zhou, "Sparsity-Based Two-Dimensional DOA Estimation for Coprime Array: From Sum-Difference Coarray Viewpoint" IEEE Trans. Signal Process., vol. 65, No. 21, pp. 5591-5604, Nov. 2017.

J. Shi, G. Hu, X. Zhang, F. Sun, W. Zheng, and Y. Xiao, "Generalized Co-Prime MIMO Radar for DOA Estimation With Enhanced Degrees of Freedom" IEEE Sensors Journal, vol. 18, No. 3, pp. 1203-1212, Feb. 2018.

A. G. Raj and J. H. McClellan, "Single Snapshot Super-Resolution DOA Estimation for Arbitrary Array Geometries" IEEE Signal Process Lett., vol. 26, No. 1, pp. 119-123, Jan. 2019.

C. Zhou, Z. Shi, Y. Gu, and X. (S.) Shen, "DECOM: DOA Estimation with Combined MUSIC for Coprime Array" International Conference on Wireless Communications and Signal Processing, 2013.

Texas Instrument, "MIMO Radar Application Report." SWRA554A—May 2017—Revised Jul. 2018.

Zhi-Kun Chen, Feng-Gang Yan, Xiao-Lin Qiao, and Yi-Nan Zhao. "Sparse Antenna Array Design for MIMO Radar Using Multiobjective Differential Evolution" Hindawi Publishing Corporation, International Journal of Antennas and Propagation, vol. 2016 (2016).

Zhang, R., "Joint High-Resolution Range and DOA Estimation via MUSIC Method Based on Virtual Two-Dimensional Spatial Smoothing for OFDM Radar", International Journal of Antennas and Propagation, vol. 2018, Art. ID 6012426, 9 pages; https://doi.org/10.1155/2018/6012426, Nov. 21, 2018.

* cited by examiner

RADAR APPARATUS AND METHOD

OVERVIEW

Aspects of various embodiments are directed to radar apparatuses/systems and related methods.

In certain radar signaling applications, high spatial resolution may be desirable for separating objects located at the same distance, and which may further involve the same velocity. For instance, it may be useful to discern directional characteristics of radar reflections from two or more objects that are closely spaced, to accurately identify information such as location and velocity of the objects. Such an approach may be particularly useful in automotive environments.

Uniform antenna arrays may mitigate issues with replicas (e.g., of a main lobe, as may be referred to as grating lobes), but may exhibit less than desirable spatial resolution, and are susceptible to ambiguities under large element spacing scenarios. Multiple-input multiple-output (MIMO) antennas can be used to achieve a higher spatial resolution, however such approaches can be challenging to implement successfully, particularly in rapidly-changing environments such as those involving an automobile travelling at speed. Further, cross-correlation among sources may result in errors.

These and other matters have presented challenges to efficiencies of radar implementations, for a variety of applications.

SUMMARY

Various example embodiments are directed to issues such as those addressed above and/or others which may become apparent from the following disclosure, and including those concerning utilization of radar signals and related processing.

In certain example embodiments, aspects of the present disclosure involve using respective MIMO arrays together, each array having uniform transmitting and receiving antennas in a sparse arrangement, to provide a non-uniform co-prime array configuration. Reflections of transmitted signals received in each array may be compared and utilized to suppress ambiguities, for instance via spatial smoothing. In various contexts, it has been recognized/discovered that utilizing sparse MIMO arrays in this manner may achieve high resolution while the ensuing comparison mitigates ambiguities in received signals. Resultant arrays may thus be co-prime in terms of antenna spacing and number of elements, which may compensate effective array aperture reduction and enhance spatial resolution. Such approaches may be particularly useful in automotive and other vehicle environments involving high-speed and use for high spatial resolution, for example with autonomous driving and driver assistance systems, which facilitates distinguishing sources inside a narrow field-of-view (FOV).

In a more specific example embodiment, an apparatus includes communication circuitry and a non-uniform multi input/multi output (MIMO) antenna array that includes first and second uniform MIMO antenna arrays respectively having both sparsely-arranged transmitting antennas and sparsely-arranged receiving antennas. The communication circuitry is configured to determine a direction of arrival (DOA) of reflections of radar signals transmitted by the transmitting antennas and received by the receiving antennas, by comparing the reflections received by the first MIMO array with the reflections received by the second MIMO array during a common time period (e.g., at the same time). Using this approach, the antenna arrays may be utilized to provide co-prime spacing/elements and to suppress ambiguities in received reflections based on alignment thereof.

In another specific example embodiment, an apparatus includes radar communication circuitry that operates with first and second uniform MIMO antenna arrays that are used together in a non-uniform arrangement. The first uniform MIMO antenna array has transmitting antennas and receiving antennas in a first sparse arrangement, and the second uniform MIMO antenna array has transmitting antennas and receiving antennas in a second sparse arrangement that is different than the first sparse arrangement. The radar communication circuitry is with the first and second MIMO antenna arrays to transmit radar signals utilizing the transmitting antennas in the first and second MIMO arrays, and to receive reflections of the transmitted radar signals from an object utilizing the receiving antennas in the first and second MIMO arrays. The radar communication circuitry is further configured to ascertain directional characteristics of the object relative to the antennas by comparing the reflections received by the first MIMO array with the reflections received by the second MIMO array during a common time period.

Another embodiment is directed to a method as follows. Radar signals are transmitted utilizing transmitting antennas in first and second multi input/multi output (MIMO) antenna arrays, the first MIMO antenna array having transmitting antennas and receiving antennas in a first sparse arrangement and the second MIMO antenna array having transmitting antennas and receiving antennas in a second sparse arrangement that is different than the first sparse arrangement. The second uniform MIMO antenna array is arranged with the first uniform MIMO antenna array in a non-uniform arrangement. Reflections of the transmitted radar signals are received from an object utilizing the receiving antennas in the first and second MIMO arrays. Directional characteristics of the object relative to the antennas are ascertained by comparing the reflections of the transmitted radar signals received by the first MIMO array with the reflections of the transmitted radar signals received by the second MIMO array during a common time period.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
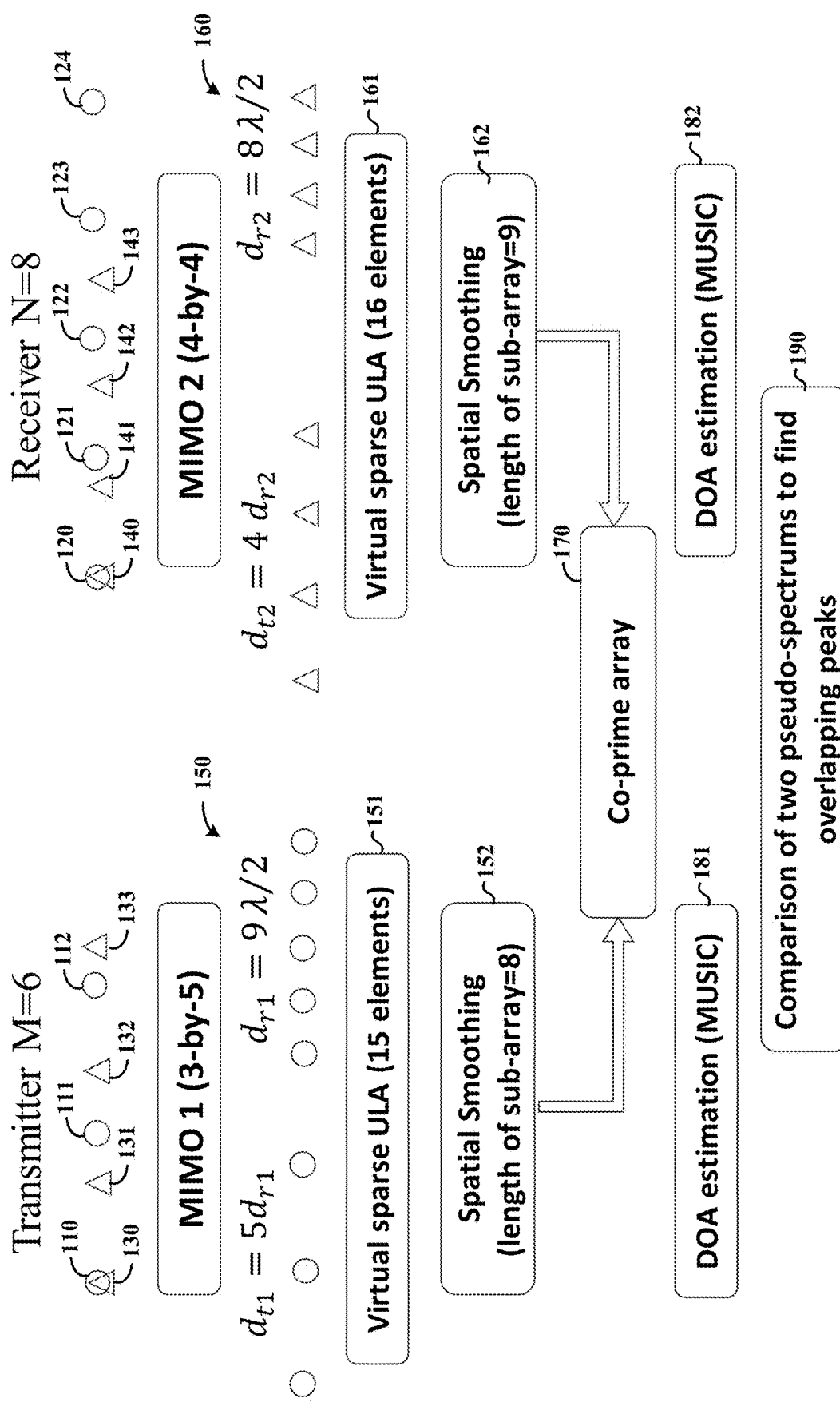
FIG. 1 shows an apparatus with MIMO antenna arrays and related approach for radar communications, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving radar systems and related communications. In certain implementations, aspects of the present disclosure have been shown to be beneficial when used in the context of automotive radar in environments susceptible to the presence of multiple objects within a relatively small region. In some embodiments, respective MIMO antenna arrays are used together to provide a non-uniform array, and are processed to facilitate detection of corresponding signals received via each MIMO antenna array. For instance, a particular embodiment is directed to a joint multiple-input multiple-output (MIMO)/co-prime array configuration configured for a single snapshot DOA estimation of an automotive radar. Antennas at both transmitters and receivers are grouped to form two MIMO sets which may generate virtual uniform linear arrays (ULA) with an increased inter-element spacing. Correlation among sources may be suppressed in a way that the resultant arrays are co-prime in terms of antenna spacing and number of elements, for instance by applying a spatial smoothing algorithm to both virtual arrays, or by utilizing one or more of forward backward averaging, diagonal averaging, and other known methods. The co-primality may compensate for effective array aperture reduction of spatial smoothing, and enhance spatial resolution. Applications may include long-range automotive radar where a high spatial resolution is required to distinguish limited number of sources inside a narrow FOV. While not necessarily so limited, various aspects may be appreciated through the following discussion of non-limiting examples which use exemplary contexts.

Accordingly, in the following description various details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In accordance with a particular embodiment, antennas at both a transmitter and receiver are divided in two groups, (M=a+b) and (N=c+d), producing two MIMO. Each set generates a virtual uniform linear array respectively with elements "ac" and "bd" from the above. The virtual arrays are uniform but sparse in that element spacing in each virtual array is multiple of a wavelength. The virtual arrays from both MIMO sets are uniform, such that a spatial smoothing algorithm can be applied to each set separately in order to suppress correlation among sources. After applying special smoothing, the length of virtual arrays reduces to M' and N', respectively, where M<M'<ac and N<N'<bd. M' and N' are selected to be a co-prime pair. The spacing between physical antenna elements in two MIMO sets are defined in a way that the two spatially smoothed virtual arrays satisfy the co-primality design principle. That is, the element spacing in arrays with M' and N' elements are N' λ/2 and M' λ/2, respectively, where λ is the wavelength. Therefore, the spatially smoothed virtual arrays form a co-prime array with M' N' DOF, where M'N'>MN.

DOA estimation may be performed for each MIMO set separately. The spectrums may exhibit ambiguities since both spatially smoothed virtual arrays are uniform and sparse. The Fourier method or a multiple signal classification (MUSIC) algorithm may be utilized to estimate the DOA of each receive reflection. Due to the co-primality concept, overlapping peaks and/or grating lobs may be utilized to depict the direction of arrival from sources. Accordingly, by comparing two spectrums in the FOV, overlapping peaks can be distinguished and therefore the DOA can be estimated.

In another specific example embodiment, an apparatus includes radar communication circuitry that operates with first and second uniform MIMO antenna arrays that are used together in a non-uniform arrangement. The first uniform MIMO antenna array has transmitting antennas and receiving antennas in a first sparse arrangement, and the second uniform MIMO antenna array has transmitting antennas and receiving antennas in a different sparse arrangement. The radar communication circuitry operates with the first and second MIMO antenna arrays to transmit radar signals utilizing the transmitting antennas in the first and second MIMO arrays, and to receive reflections of the transmitted radar signals from an object utilizing the receiving antennas in the first and second MIMO arrays. Directional characteristics of the object relative to the antennas are determined by comparing the reflections received by the first MIMO array with the reflections received by the second MIMO array during a common time period. Such a time period may correspond to a particular instance in time (e.g., voltages concurrently measured at feed points of the receiving antennas), or a time period corresponding to multiple waveforms. The MIMO antennas may be spaced apart from one another within a vehicle with the radar communication circuitry being configured to ascertain the directional characteristics relative to the vehicle and the object as the vehicle is moving through a dynamic environment. An estimate of the DOA may be obtained and combined to determine an accurate DOA for multiple objects.

The sparse arrangements may involve a variety of spacing and numbers of antennas, to suit particular applications. For instance, the transmitting antennas and receiving antennas of each MIMO array may be spaced at different distances, meaning four different distances for a pair of MIMO arrays. Such distances may be at least ½ of a wavelength at which the MIMO array transmits radar signals.

The reflections may be compared in a variety of manners. In some implementations, a reflection detected by the first MIMO array that overlaps with a reflection detected by the second MIMO array is identified and used for determining DOA. Correspondingly, reflections detected by the first MIMO array that are offset in angle relative to reflections detected by the second MIMO array. The reflections may also be compared during respective instances in time; and used together to ascertain the directional characteristics of the object. Further, time averaging may be utilized to provide an averaged comparison over time (e.g., after spatial smoothing).

The radar communication circuitry is implemented in a variety of manners. In some embodiments, the radar communication circuitry suppresses ambiguities in reflections received by the first and second MIMO arrays based on misalignment of corresponding reflections received by each array. The radar communication circuitry may suppress correlation among sources such that the arrays are co-prime in terms of antenna spacing and number of elements. Suppression of correlation in this regard may involve spatially smoothing the reflections, forward backward averaging and/or diagonal averaging. These approaches may be utilized to maintain co-prime properties of the arrays after de-correlation. In certain implementations, the radar communication circuitry may ascertain the directional characteristics by discarding non-matching peaks in the compared reflections and determining a direction of the object based on the remaining peaks in the compared reflections.

In a particular embodiment, the radar communication circuitry ascertains the directional characteristics by identifying multiple possible angles to the object based on the reflections received by the first MIMO array, and identifies multiple possible angles to the object based on the reflections received by the second MIMO array. The radar communication circuitry then determines an angle at which the object lies relative to the MIMO antenna arrays by selecting one of the multiple possible angles identified from the first MIMO array that corresponds to one of the multiple possible angles identified from the second MIMO array.

Another embodiment is directed to a method as follows. Radar signals are transmitted via transmitting antennas in MIMO antenna arrays respectively having transmitting antennas and receiving antennas in different sparse arrangements, with the arrays being utilized together to form a non-uniform arrangement. For instance, each of four sets of antennas (one transmitting and one receiving in each array) may be internally spaced at different distances relative to the spacing in the other sets. Reflections of transmitted radar signals are received from an object utilizing the receiving antennas. Directional characteristics of the object relative to the antennas are ascertained by comparing the reflections of the transmitted radar signals received by the MIMO arrays during a common time period. Comparing the reflections may include identifying overlapping reflections from each array received at the same time, and using the identified reflections to determine a direction at which the object lies relative to the antenna arrays. Comparing the reflections may further include identifying the reflections detected by the first MIMO array that are offset in angle relative to the reflections detected by the second MIMO array. The reflected signals may be spatially smoothed and correlation among sources suppressed such that the arrays are co-prime in terms of antenna spacing and number of elements.

In some implementations, the directional characteristics are ascertained by identifying multiple possible angles to the object based on the reflections received by the first MIMO array and identifying multiple possible angles to the object based on the reflections received by the second MIMO array. An angle at which the object lies relative to the MIMO antenna arrays is then determined by selecting one of the multiple possible angles identified from the first MIMO array that corresponds to one of the multiple possible angles identified from the second MIMO array.

Turning now to the figures, FIG. 1 shows an apparatus with MIMO antenna arrays and related approach for radar communications, in accordance with the present disclosure. The apparatus includes M=6 transmitting antennas and N=8 receiving antennas A first MIMO array includes antennas represented by circles, including transmitting antennas 110, 111 and 112 as well as receiving antennas 120, 121, 122, 123 and 124. A second MIMO antenna array includes antennas represented by triangles, including transmitting antennas 130, 131, 132 and 133 as well as receiving antennas 140, 141, 142 and 143. Note that each array uses an overlapping antenna, such that antennas 110/130 and 120/140 may be a common antenna. Accordingly, the number of elements in the two transmitter arrays is a=3,b=4, while this number in their corresponding receiver arrays is c=5,d=4, respectively. This clustering approach generates two MIMO sets 150 and 160 which may satisfy $$d_t = N d_r \tag{1}$$

where $d_t$, $d_r$, and N are the element spacing at the transmitter, the element spacing at the receiver and the number of elements at the receiver, respectively. Radar signals thus transmitted experience multiplication by both transmit and receive antenna array patterns, which can be represented by a convolution of the transmit and receive antenna positions resulting in a new virtual array. For this example, virtual ULAs 151 and 161 with ac=15 and bd=16 elements are respectively generated. Afterwards, a spatial smoothing algorithm can be applied at 152 and 162 to each of them separately in order to reduce cross-correlation among sources. For general information regarding spatial smoothing, and for specific information regarding an approach/algorithm that may be utilized herein, reference may be made to. T. J. Shan, M. Wax, and T. Kailath, "On Spatial Smoothing for Direction-of-Arrival Estimation of Coherent Signals" *IEEE Trans. Acoustics, Speech, and Signal Process*, vol. ASSP-33, no. 4, pp. 806-811, August 1985, which is fully incorporated herein by reference.

The virtual arrays may be uniform with the element spacing larger than $\lambda/2$, such that two arrays having M' and N' elements with N' d and M' d, element spacings, respectively, from a co-prime array 170 when M' and N' are co-prime numbers and d is the unit spacing. Therefore, the length of sub-arrays in the spatial smoothing algorithm for the two MIMO sets may be selected to be co-prime, M'=8 and N'=9. The value of M' and N' define the receiver element spacing at the two MIMO sets based on the co-prime array design principle where unit spacing is $(d=\lambda)/2$. The transmitter element spacing can be achieved through a MIMO design principle, such that element spacing at the spatially smoothed virtual arrays from the MIMO sets are $9\lambda/2=4.5\lambda$ and $8\lambda/2=4\lambda$, respectively. The element spacing at the transmitter of the MIMO sets is $22.5\lambda$ and $16\lambda$, respectively. Example MIMO/co-prime configuration and element spacing computation at both MIMO sets are shown by way of example. DOA estimation may be carried out for each MIMO array at 181 and 182, respectively, shown as using a MUSIC algorithm as characterized herein by way of example. A comparison of two pseudo-spectrums may be made at 190 to identify overlapping peaks and, therein, directional characteristics of objects. For general information regarding sparse sensing and co-prime arrays, and for specific information for such approaches as may be implemented with one or more embodiments, reference may be made to P. P. Vaidyanathan and P. Pal, "Sparse Sensing with Co-Prime Samplers and Arrays" *IEEE Trans. Signal Pro-* cess, vol. 59, no. 2, pp. 573-586, February 2011, which is fully incorporated herein by reference.

Figure 2:
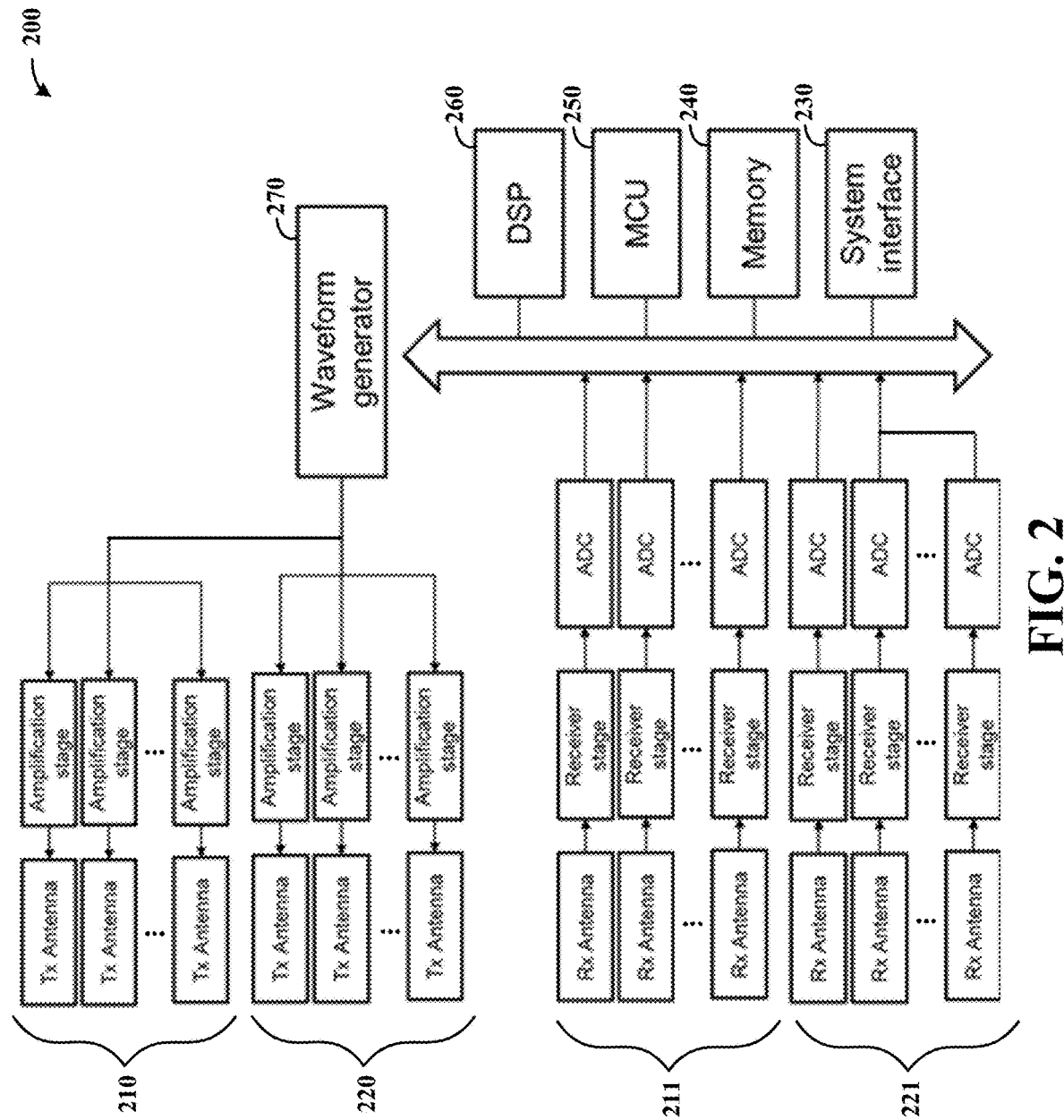
FIG. 2 shows an apparatus with MIMO antenna arrays for radar communications, in accordance with the present disclosure.

FIG. 2 shows an apparatus 200 with MIMO antenna arrays for radar communications, in accordance with the present disclosure. The apparatus includes respective MIMO antenna arrays, including a first MIMO array having transmitting and receiving antennas 210/211, and a second MIMO array having transmitting and receiving antennas 220/221. The number of transmitting and receiving antennas in each array is sparse, with only three antennas shown for each by way of example (in which ellipses depict additional antennas as may be implemented). Each transmitting and receiving array has equal spacing within, which is different from spacing of the other arrays. Accordingly, amplification stages, receiver stages, and analog-to-digital (ADC) converters may similarly be replicated for the arrays as shown, as additional antennas are included. The antenna arrays may be utilized in accordance with one or more embodiments herein, such as to generate a non-uniform array with a MIMO/co-prime array configuration.

The apparatus may include a system interface 230, memory 240, microcontroller 250, a digital signal processor 260, and a waveform generator 270 (two separate waveforms may be generated respectively for the transmitter arrays 210 and 220). The microcontroller 250 may be implemented in accordance with the radar communication circuitry for operating the arrays for MIMO/co-prime configuration with comparison of reflections for detecting overlapping peaks. Such an approach may be utilized with automotive radars. The waveform can be a linear Frequency Modulation Continuous Wave type. A sequence of frequency ramps may be emitted on multiple transmit antennas, and the frequency ramp transmitted from each antenna may be encoded by Time Division Multiple Access or Frequency Division Multiple Access techniques to enable MIMO capabilities. The received signal may be processed using a matched filtering based approach for each receiving channel. The outcome of the matched filter describes the measurement of the environment in radial distance and relative velocity for each transmit-receive antenna combination. A subsequent target detection algorithm may be used to identify the distance and velocity at which targets reside. After the detection process a complex valued data vector may be available in which the amplitude and phase response of the channel between each transmit and each receive antenna is described, in which the vector may be referred to as snapshot.

Figure 3:
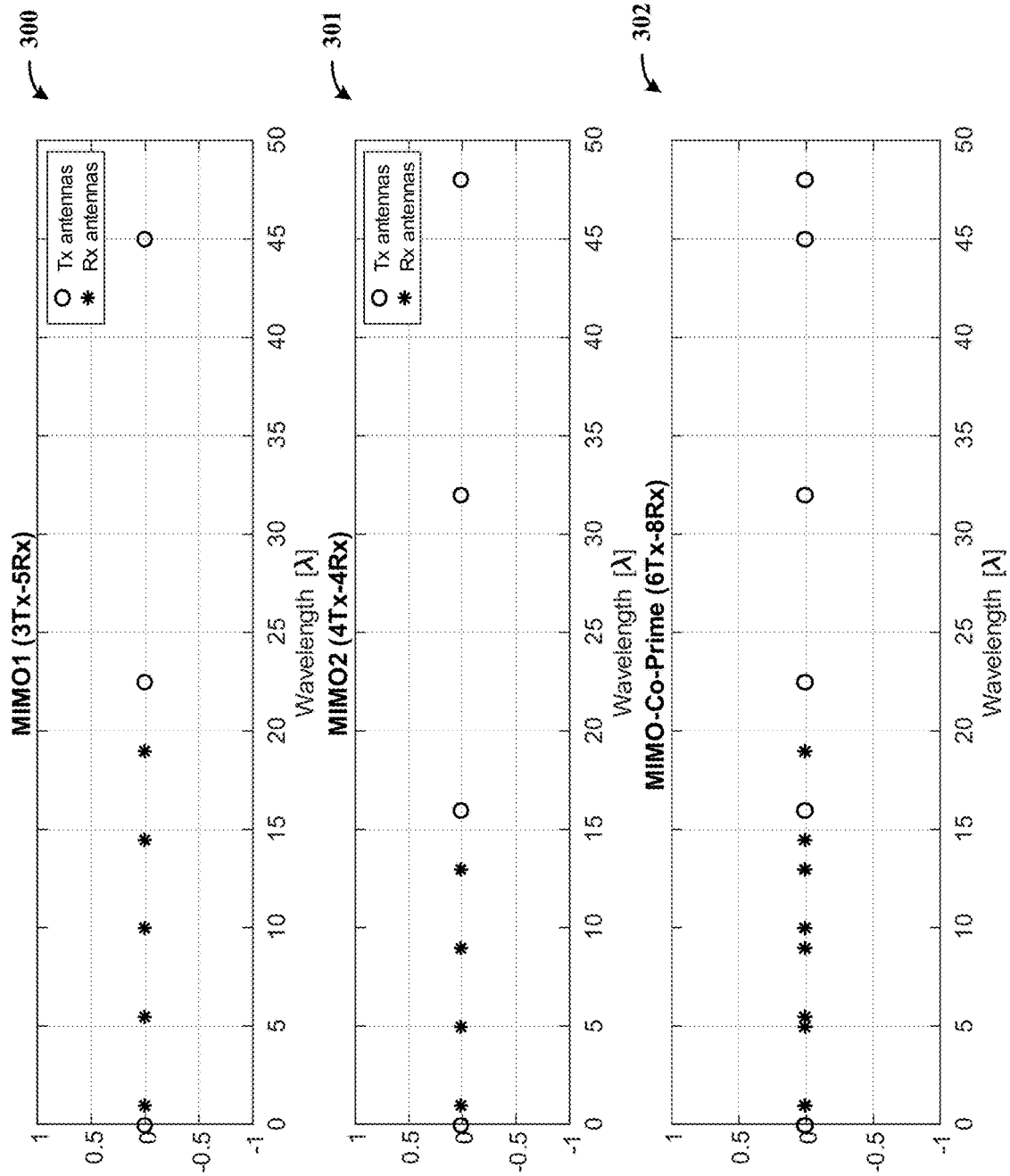
FIG. 3 shows sparse MIMO antenna arrays with related wavelength spacing, as may be implemented in accordance with the present disclosure.

FIG. 3 shows sparse MIMO antenna arrays 300 and 301 with related wavelength spacing, which may be used together to form a co-prime array 302, as may be implemented in accordance with the present disclosure. In arrays 300 and 301 the element spacing between the transmitter elements (circles) within each array is uniform, and the element spacing between the receiver elements (stars) is also uniform. In the co-prime array 302, which is the combination of 300 and 301, non-uniform arrays are depicted in which the spacing between circles is not constant and the spacing between stars is not constant.

Figure 4:
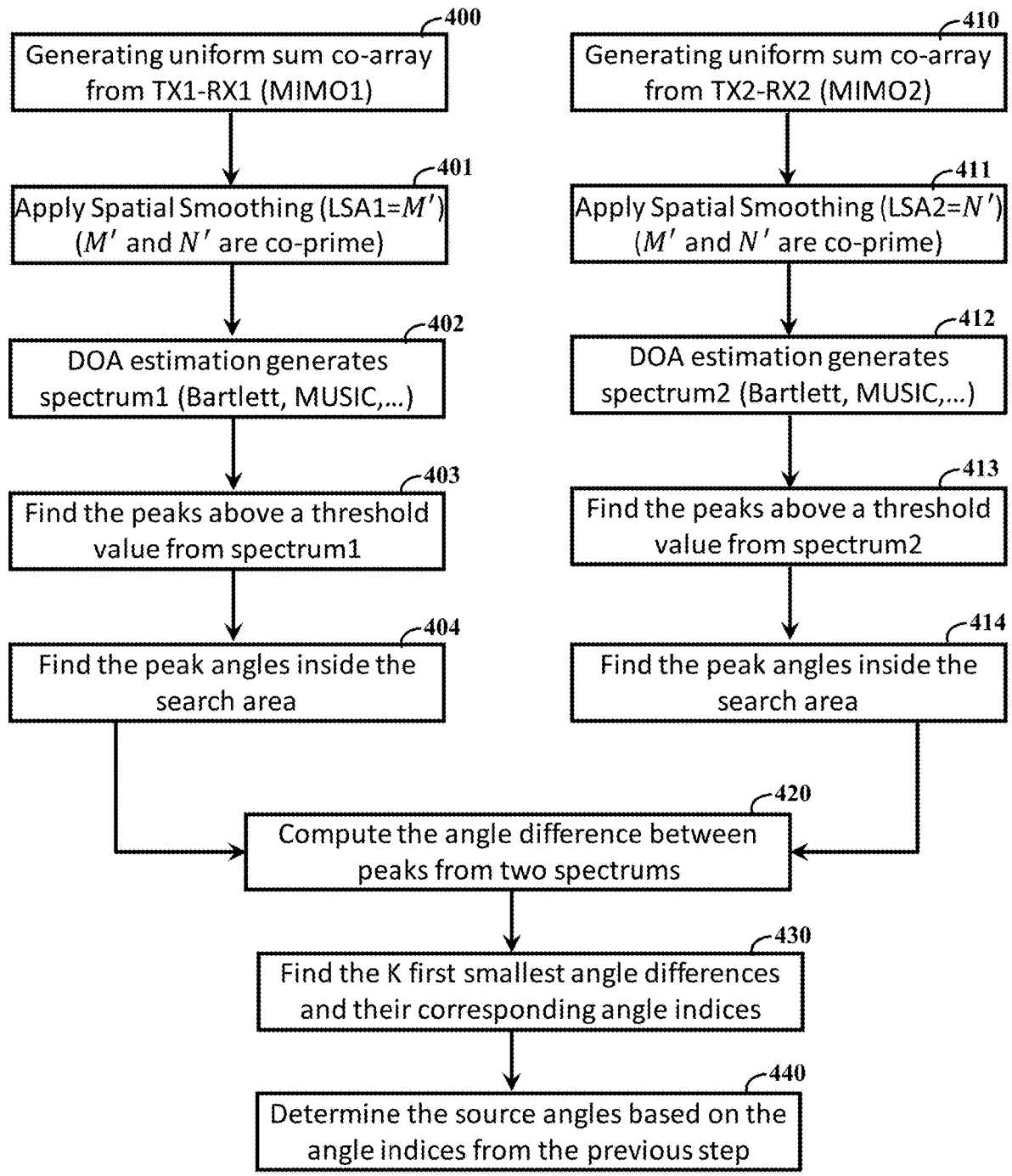
FIG. 4 shows a flow diagram for radar signaling, in accordance with the present disclosure.

FIG. 4 shows a flow diagram for radar signaling, in accordance with the present disclosure. The approach depicted therein may be utilized for a single snapshot DOA estimation of K narrowband signals using a MIMO/co-prime radar. Steps 400-404, and 410-414, are similar and respectively applied to each of two MIMO arrays. At 400/410, a uniform sum co-array is generated, and spatial smoothing is applied at 401/411. DOA estimation is carried out at 402/412 and peaks above a threshold are identified at 403/413. Peak angles in a search area are located at 404/414 and a corresponding angle difference between the peaks in the two spectrums (from both arrays) is calculated at 420. The first smallest angle differences are found at 430 and the source angles (to an object) are determined at 440 based on angle indices found at 430.

The MUSIC algorithm may be used to estimate the DOA at 402/412 and generate two pseudo-spectrums separately. Since each spatially smoothed virtual array is a sparse array, fake peaks may appear in the pseudo-spectrums due to the grating lobe problem. However, in connection with the recognition/discovery herein, due to the co-primality principle the overlapping peaks reveal the source angles while the fake peaks are not overlapping, such that the source angles can be identified (at 440). In some instances where residual correlation among sources generate an error in the DOA estimation, the differences in the peak locations can be investigated in place and with smallest differences between peak locations revealing the actual source angles.

Figure 5:
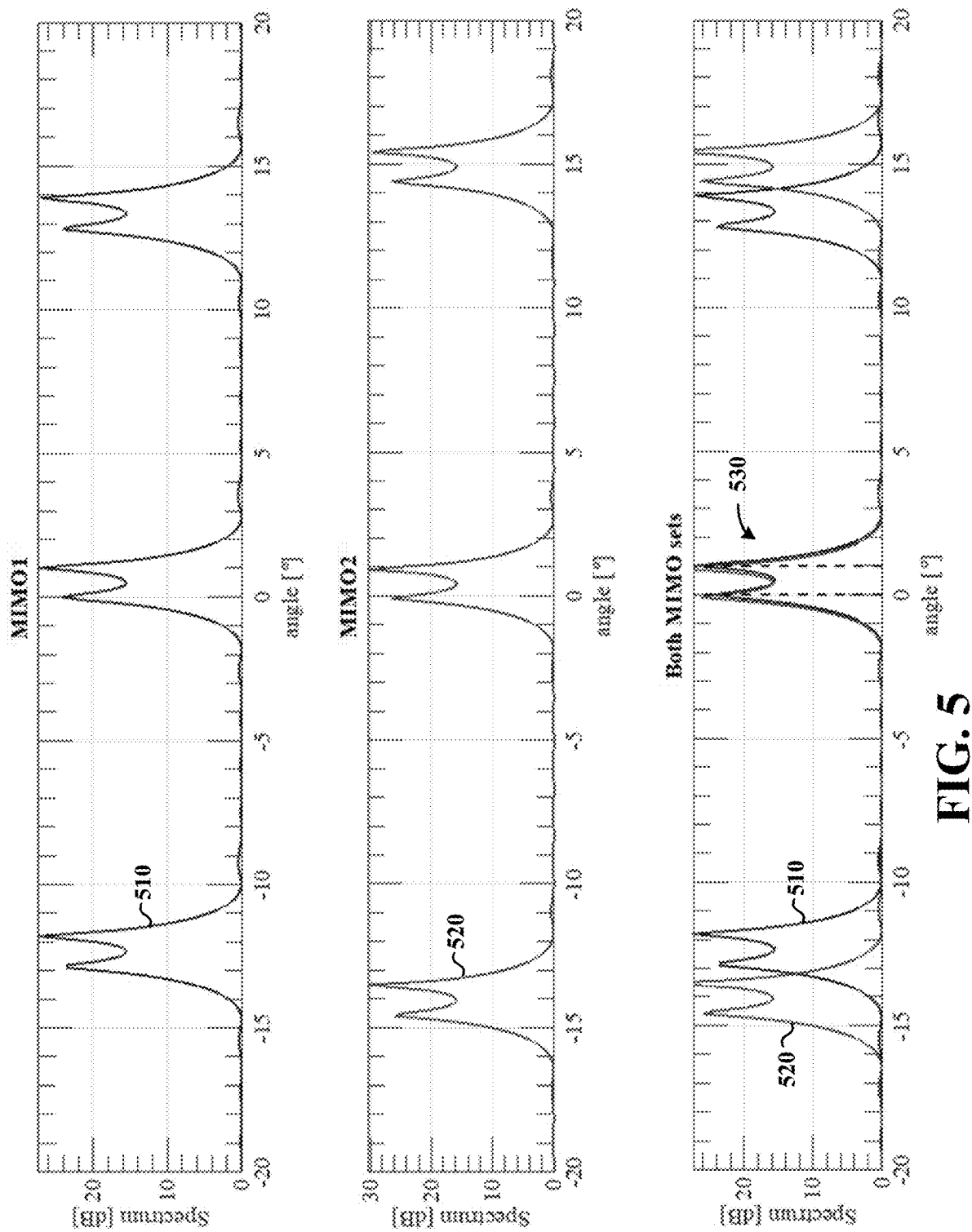
FIG. 5 shows plots for received radar signals and related comparison thereof, in accordance with the present disclosure.

FIG. 5 shows plots for received radar signals and related comparison thereof, in accordance with the present disclosure. Plot 510 shows a spectrum for a first MIMO array, plot 520 shows a spectrum for a second MIMO array 520, with an overlay of the two plots showing a correlated peak at 530 that can be used for ascertaining directional characteristics as noted herein. These plots may depict a single snapshot DOA estimation of two equal-power sources located nearby at 0° and 1° using a MIMO/co-prime radar approach, consistent with one or more aspects of the disclosure. For instance, this approach may utilize one or more apparatuses as characterized herein, such as that depicted in FIG. 1 and/or in FIG. 2.

As may be implemented with one or more embodiments herein, the FOV is limited to mitigate potential issues where "fake" peaks may exhibit smaller angle differences than actual peaks. Narrowing the FOV can reduce such instances. For instance, using a MIMO/co-prime configuration with two sets of sparse arrays, the maximum grating lobe free FOV due to the sources inside the FOV may be set based on maximum element spacing. A largest possible FOV may thus be determined in a way that, for any source location inside the FOV, its corresponding grating lobes happen outside the FOV. The following equation can be used to determine the location of the first grating lobe from a sparse array:

$$\cos(\alpha_0) - \cos(\alpha_{gl}) = \lambda/d_s \tag{2}$$

where $\alpha_0$ and $\alpha_{gl}$ are the main and the first grating lobe angles and $d_s$ is the element spacing in the sparse array. FOV may be set equal to $\alpha_{gl} - \alpha_0$ to mitigate the presence of a grating lobe inside the FOV due to the sources inside the FOV. For larger arrays (e.g., greater than the examples herein of M'=8 and N'=9), a maximum grating lobe free FOV of about 13° can be achieved.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, communication circuitry and/or other circuit-type depictions (e.g., reference numerals 152, 162, 70, 181, 182 and 190 of FIG. 1) depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in and/or described with FIGS. 1, 2 and 4. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described at FIG. 4 is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, more or fewer antennas as shown in FIG. 1 may be utilized. As another example, certain steps may be omitted, for example with embodiments directed to carrying out part of the process characterized in FIG. 4. Further, certain embodiments are directed to components of apparatuses characterized herein (e.g., a radar communication circuit alone, as may be utilized with a myriad of disparate antenna array combinations). Such modifications do not depart from the true spirit and scope of various aspects of the disclosure, including aspects set forth in the claims

What is claimed is:

1. An apparatus comprising:
a first uniform multi input/multi output (MIMO) antenna array having transmitting antennas and receiving antennas in a first sparse arrangement;
a second uniform MIMO antenna array having transmitting antennas and receiving antennas in a second sparse arrangement that is different than the first sparse arrangement, the second uniform MIMO antenna array being arranged with the first uniform MIMO antenna array in a non-uniform arrangement;
radar communication circuitry configured and arranged with the first and second MIMO antenna arrays to:
transmit radar signals utilizing the transmitting antennas in the first and second MIMO arrays;
receive reflections of the transmitted radar signals from an object utilizing the receiving antennas in the first and second MIMO arrays;
suppress correlation among sources of the received reflections such that the arrays are co-prime in terms of antenna spacing and number of elements; and
ascertain directional characteristics of the object relative to the antennas by ascertaining directional characteristics of the received reflections via a single snapshot direction of arrival estimation of signals in the received reflections and by comparing peaks within a first spectrum grouping of the reflections of the transmitted radar signals received by the first MIMO array with peaks within a second spectrum grouping of the reflections of the transmitted radar signals received by the second MIMO array.

2. The apparatus of claim 1, wherein comparing the reflections includes identifying a reflection detected by the first MIMO array that overlaps with a reflection detected by the second MIMO array.

3. The apparatus of claim 1, wherein comparing the reflections includes identifying reflections detected by the first MIMO array that are offset in angle relative to reflections detected by the second MIMO array.

4. The apparatus of claim 1, wherein the radar communication circuitry is configured and arranged with the first and second MIMO antenna arrays to ascertain the directional characteristics by suppressing ambiguities in reflections received by the first and second MIMO arrays based on misalignment of corresponding reflections received by each array.

5. The apparatus of claim 1, wherein the radar communication circuitry is configured and arranged with the first and second MIMO antenna arrays to suppress correlation among sources such that the arrays are co-prime in terms of antenna spacing and number of elements, wherein the radar communication circuitry is to ascertain the directional characteristics of the received reflections by using the single snapshot direction of arrival estimation of signals in the received reflections.

6. The apparatus of claim 1, wherein the radar communication circuitry is configured and arranged with the first and second MIMO antenna arrays to ascertain the directional characteristics by:
identifying multiple possible angles to the object based on the reflections received by the first MIMO array;
identifying multiple possible angles to the object based on the reflections received by the second MIMO array; and
determine an angle at which the object lies relative to the MIMO antenna arrays by selecting one of the multiple possible angles identified from the first MIMO array that corresponds to one of the multiple possible angles identified from the second MIMO array.

7. The apparatus of claim 1, wherein:
the transmitting antennas of the first MIMO array are spaced at a first distance;
the receiving antennas of the first MIMO array are spaced at a second distance;
the transmitting antennas of the second MIMO array are spaced at a third distance; and
the receiving antennas of the second MIMO array are spaced at a fourth distance, the first, second, third and fourth distances being different from one another.

8. The apparatus of claim 1, wherein:
the transmitting antennas within the first MIMO array are spaced from one another by a first distance;
the receiving antennas within the first MIMO array are spaced from one another by a second distance;
the transmitting antennas within the second MIMO array are spaced from one another by a third distance; and
the receiving antennas within the second MIMO array are spaced from one another by a fourth distance, the first, second, third and fourth distances being different than one another and at least ½ of a wavelength at which the MIMO arrays transmit the radar signals.

9. The apparatus of claim 1, wherein the single snapshot direction of arrival estimation corresponds to a particular instance in time.

10. The apparatus of claim 1, wherein the radar communication circuitry is configured to ascertain the directional characteristics of the object by:
comparing the reflections of the transmitted radar signals received by the first MIMO array with the reflections of the transmitted radar signals received by the second MIMO array during respective instances in time; and
using the compared reflections at each instance in time to ascertain the directional characteristics of the object.

11. The apparatus of claim 1, wherein:
the single snapshot direction of arrival estimation is for a common time period during which multiple waveforms of the reflections are received by each of the MIMO arrays; and
comparing the reflections includes comparing the multiple waveforms of the reflections received by the first MIMO array with the multiple waveforms of the reflections received by the second MIMO array.

12. The apparatus of claim 1, wherein the radar communication circuitry is configured to ascertain the directional characteristics by discarding non-matching peaks in the compared reflections and determining a direction of the object based on the remaining peaks in the compared reflections.

13. The apparatus of claim 1, wherein the MIMO antennas are spaced apart from one another within a vehicle and the radar communication circuitry is configured and arranged to ascertain the directional characteristics relative to the vehicle and the object as the vehicle is moving through a dynamic environment.

14. An apparatus comprising:
a non-uniform multi input/multi output (MIMO) antenna array including first and second uniform MIMO antenna arrays respectively having both sparsely-arranged transmitting antennas and sparsely-arranged receiving antennas;
processing circuitry to:
characterize the first and second uniform MIMO antenna arrays into a first MIMO set (M) of uniform and sparse virtual antenna array and a second MIMO set (N) of uniform and sparse virtual antenna array, spatially smooth reflections received in the first set and spatially smooth the reflections received in the second set and in response selecting a first subset (M') of the first MIMO set (M) and a second subset (N') of the second MIMO set (N), wherein the first and second subsets form a co-prime pair of first and second spatially-smoothed virtual antenna arrays,
characterize a first spectrum by estimating a first direction of arrival of received reflections for the first of the co-prime pair of spatially-smoothed virtual antenna arrays and characterize a second spectrum by estimating a second direction of arrival of received reflections for the second of the co-prime pair of spatially-smoothed virtual antenna arrays; and
communication circuitry configured and arranged to determine a direction of arrival of reflections of radar signals transmitted by the transmitting antennas and received by the receiving antennas, by comparing peaks associated with the reflections in the first and second spectrums.

15. A method comprising:
transmitting radar signals utilizing transmitting antennas in first and second multi input/multi output (MIMO) antenna arrays, the first MIMO antenna array having transmitting antennas and receiving antennas in a first sparse arrangement and the second MIMO antenna array having transmitting antennas and receiving antennas in a second sparse arrangement that is different than the first sparse arrangement, the second MIMO antenna array being arranged with the first MIMO antenna array in a non-uniform arrangement;
receiving reflections of the transmitted radar signals from an object utilizing the receiving antennas in the first and second MIMO arrays;
suppressing correlation among sources of the received reflections such that the arrays are co-prime in terms of antenna spacing and number of elements; and
ascertaining directional characteristics of the object relative to the antennas by ascertaining directional characteristics of the received reflections via a single snapshot direction of arrival estimation of signals in the received reflections and by comparing peaks within a first spectrum grouping of the reflections of the transmitted radar signals received by the first MIMO array with peaks within a second spectrum grouping of the reflections of the transmitted radar signals received by the second MIMO array.

16. The method of claim 15, wherein comparing the reflections includes identifying one of the reflections detected by the first MIMO array that overlaps with one of the reflections detected by the second MIMO array and received at the same time, and using the identified one of the reflections to determine a direction at which the object lies relative to the antenna arrays.

17. The method of claim 15, wherein comparing the reflections includes identifying the reflections detected by the first MIMO array that are offset in angle relative to the reflections detected by the second MIMO array.

18. The method of claim 15, wherein ascertaining the directional characteristics includes spatially smoothing the reflections received in the first and second MIMO arrays.

19. The method of claim 15, wherein ascertaining the directional characteristics includes:
identifying multiple possible angles to the object based on the reflections received by the first MIMO array;
identifying multiple possible angles to the object based on the reflections received by the second MIMO array; and
determine an angle at which the object lies relative to the MIMO antenna arrays by selecting one of the multiple possible angles identified from the first MIMO array that corresponds to one of the multiple possible angles identified from the second MIMO array.

20. The method of claim 15, wherein:
the transmitting antennas of the first MIMO array are spaced at a first distance;

the receiving antennas of the first MIMO array are spaced at a second distance;
the transmitting antennas of the second MIMO array are spaced at a third distance; and
the receiving antennas of the second MIMO array are spaced at a fourth distance, the first, second, third and fourth distances being different from one another.

* * * * *